United States Patent
Oshio

(10) Patent No.: US 6,519,354 B1
(45) Date of Patent: Feb. 11, 2003

(54) METHOD AND APPARATUS FOR PROJECTING MR ANGIOGRAPHIC DATA

(75) Inventor: Koichi Oshio, Brookline, MA (US)

(73) Assignee: Brigham and Women's Hospital, Inc., Boston, MA (US)

( * ) Notice: Subject to any disclaimer, the term of this patent is extended or adjusted under 35 U.S.C. 154(b) by 0 days.

(21) Appl. No.: 09/395,556

(22) Filed: Sep. 14, 1999

Related U.S. Application Data

(60) Provisional application No. 60/100,773, filed on Sep. 17, 1998.

(51) Int. Cl.[7] .................................................. G06K 9/00
(52) U.S. Cl. ........................................ 382/130; 382/285
(58) Field of Search .................................. 382/130, 285

(56) References Cited

U.S. PATENT DOCUMENTS

| | | | | |
|---|---|---|---|---|
| 5,204,627 A | * | 4/1993 | Mistretta et al. ............. 324/307 |
| 5,233,299 A | * | 8/1993 | Souza et al. .................. 324/307 |
| 5,368,033 A | * | 11/1994 | Moshfeghi ................ 128/653.4 |
| 5,417,213 A | * | 5/1995 | Prince ....................... 128/653.3 |
| 5,762,065 A | * | 6/1998 | Prince .......................... 600/419 |
| 5,792,056 A | * | 8/1998 | Prince .......................... 324/307 |
| 5,827,187 A | * | 10/1998 | Wang et al. ................... 324/306 |
| 5,873,825 A | * | 2/1999 | Mistretta et al. ............ 324/307 |
| 5,928,148 A | * | 7/1999 | Wang et al. ................... 324/306 |
| 6,148,095 A | * | 11/2000 | Prause et al. ................ 128/916 |

* cited by examiner

*Primary Examiner*—Joseph Mancuso
*Assistant Examiner*—Anand Bhatnagar
(74) *Attorney, Agent, or Firm*—Michael A. Sanzo; Fitch, Even, Tabin & Flannery

(57) ABSTRACT

The present invention creates detailed 2D images from 3D sets of angiographic data. First, a 3D set of angiographic data is acquired. Next, one determines from which perspective they wish to view the 3D data. After the perspective is selected, for each pixel in the 2D image to be created, an imaginary ray is extended through the 3D data set, according to the perspective from which the 2D image is being rendered. For each ray, the n most intense data points intersected by that ray are selected and summed together. Finally, the 2D image is created on a pixel by pixel basis, with each pixel being displayed according to the sum of the n most data points intersected by the ray associated with that pixel.

20 Claims, 3 Drawing Sheets

METHOD AND APPARATUS FOR PROJECTING MR ANGIOGRAPHIC DATA

REFERENCE TO EARLIER FILED APPLICATION

This application claims the benefit of U.S. Provisional Application No. 60/100,773, filed Sep. 17, 1998.

BACKGROUND OF THE INVENTION

1. Technical Field

The present invention relates generally to MR angiography. Specifically, the present invention displays MR angiograpic data that illustrates blood vessels which exists at different depths within a patient, while maintaining the contrast of the image.

2. Description of the Related Art

Before MR angiography was developed, x-ray angiography was used to image blood vessels within the human body. To create these images, a substance that was highly absorptive of x-rays was injected into the patient's blood vessels. A film was then exposed to x-rays that were passed through the patient's body, and the blood vessels were clearly shown on the film, due to the injected substance. Once the film was developed, blood vessels within the patient appeared as semitransparent vessels. The resulting images also displayed blood vessels that were located at different depths within the patient. The areas where two vessels overlapped was darker than either of the vessels themselves, and helped to convey information relating to the depth at which various vessels were located in the patient.

Angiographic images can also be created using nuclear magnetic resonance (NMR) techniques. MR angiographic images can illustrate vessels within a patient's body, but the contrast of the vessels relative to the surrounding tissue is not nearly as great when compared to the contrast achieved using x-ray angiography. This lack of contrast makes distinguishing the vessels from the surrounding tissue difficult.

MR angiographic data consists of many two dimensional (2D) image, which are also known as slices, placed together to form a three dimensional (3D) set of data which represents some volume of interest within the patient. Typically, within this volume of interest, the vessels represent the most intense images. However, as described above, their intensity is not much greater than that of the surrounding tissue.

Today, the most commonly used technique to separate the data representing the vessels from the data representing the surrounding tissue is known as the maximum intensity projection (MIP) method. This method creates a 2D image of the vessels contained in the 3D array of angiographic data. To construct the 2D image, the MIP method constructs a series of rays extending through the 3D array of data, with one ray for every pixel to be contained in the 2D image, and with every data point within the 3D array being intersected by a single ray. Then, for a given ray, the MIP method selects the single most intense data point intersected by the ray, and uses this point to control the brightness of the pixel associated with that ray. This process is repeated for each ray to create a 2D images composed of the pixels associated with each ray.

For example, the 3D array of NMR data may consist of 256×256×256 array of data values. The 2D image representing this 3D array may contain 256×256 pixels. To construct the 2D image, 256×256 rays (one for each pixel in the 2D image) are extended through the 3D array of data, with each ray intersecting 256 data points within the 3D array. For each ray, the single most intense data point out of the 256 data points intersected by the ray is selected, and this single data point is used to control the display of the pixel in the 2D image.

There are obvious deficiencies with this method. Perhaps the single most important deficiency is that only one out of every 256 data points within the 3D array is used to construct the 2D image. Thus, 255 out of the 256 data points within the 3D array are discarded and not used in constructing the 2D image. Important details and valuable information are lost in not using the vast majority of data points.

Another deficiency in the MIP method is that no information relating to vessels lying at different depths within the 3D array is shown. For example, if two vessels overlap each other, with one vessel being located in front of the other vessel from the point of view of the 2D image, the MIP method will only be able to show one of these vessels, since only one data point is selected for each ray traversing through the 3D array of data. Since only a single data point is selected, two vessels existing at different depths within the patient and which overlap will only be represented by a single data point. Thus, either the vessel in the foreground or the vessel in the background will be represented, but not both.

Other methods that create 2D images from the 3D array of data take into account all of the data points within the 3D array, unlike the MIP method. However, the majority of the data points within the 3D array represent tissue other than the blood vessels of interest. When the data points within the 3D array of data representing the background tissue are combined with the data points representing the blood vessels of interest, the large amount of data points representing background tissue can overwhelm the relatively few data points which represent the blood vessels of interest. The resulting image may contain details showing how blood vessels at different depths overlap, but much of the details surrounding the blood vessels will be "washed out" due to the inclusion of the background tissue.

Therefore, what is needed is a method that can create a 2D image from a 3D array of angiographic data which shows blood vessels existing at different depths within the 3D array of data. Such a method should also clearly show the details of these vessels, and be able to separate the data points that represent the blood vessels from the surrounding background tissue.

SUMMARY OF THE INVENTION

When characterized as a method, the present invention creates detailed 2D images from 3D arrays of angiographic data. First, a 3D array of angiographic data is acquired. Next, one determines from which perspective they wish to view the 3D data. After the perspective is selected, for each pixel in the 2D image to be created, an imaginary ray is extended through the 3D array, according to the perspective from which the 2D image is being rendered. For each ray, the n most intense data points intersected by that ray are selected and summed together. Finally, the 2D image is created on a pixel by pixel basis, with each pixel being displayed according to the sum of the n most data points intersected by the ray associated with that pixel.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
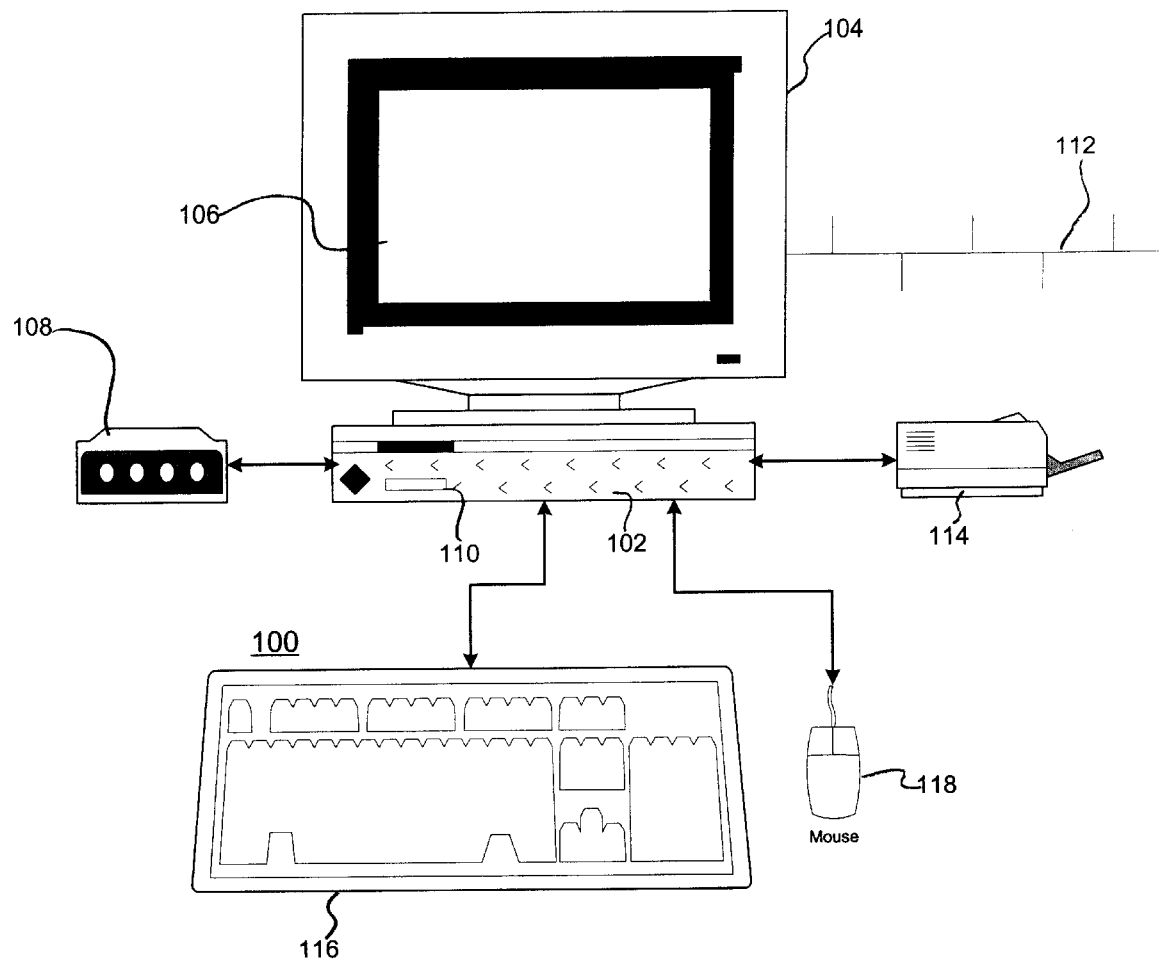
FIG. 1 illustrates a computer which can be programmed to operate according to the present invention.

FIG. 1 depicts data processing system 100, which includes processor 102 and display 104. Display 104 includes display screen 106, which may be implemented utilizing a cathode ray tube (CRT), a liquid crystal display (LCD), an electroluminescent panel, or the like. Data can be entered into data processing system 100 by means of a mouse 118 or keyboard 116. In addition to mouse 118 and keyboard 116, data can be entered using a track ball, joystick, touch sensitive tablet or screen, trackpad, or glidepad. Mouse 118 may be utilized to move a pointer or cursor on display screen 106. Processor 102 may also be coupled to one or more peripheral devices, such as modem 108 or disk drive 110, each of which may be internal or external to the enclosure of processor 102. Data processing system 100 may also be connected to network 112 in order to communicate with other computer units. Network 112 may be a local intranet (e.g., a LAN or WAN), or the network of computers known as the Internet, or both. An output device such a printer 114 may also be coupled to processor 102.

Those persons skilled in the art of computer system design should recognize that display 104, keyboard 116, and the pointing device 118 may each be implemented utilizing any one of several known off-the-shelf components. Data processing system 100 may be implemented utilizing any general purpose computer or so-called "personal computer," "workstation," or "server," such as those sold by Compaq and others.

Computer 100 as shown in FIG. 1 receives data from an NMR system in a manner well know in the art. Examples of NMR systems capable of generating such data include the one manufactured by GE Medical Systems and sold under the trade name SIGNA, and the system manufactured by Siemens Medical Systems and sold under the trade name VISION. These are but two examples of NMR systems capable of generating such data. Many other devices can generate angiographic data suitable for use with the present invention.

Figure 2:
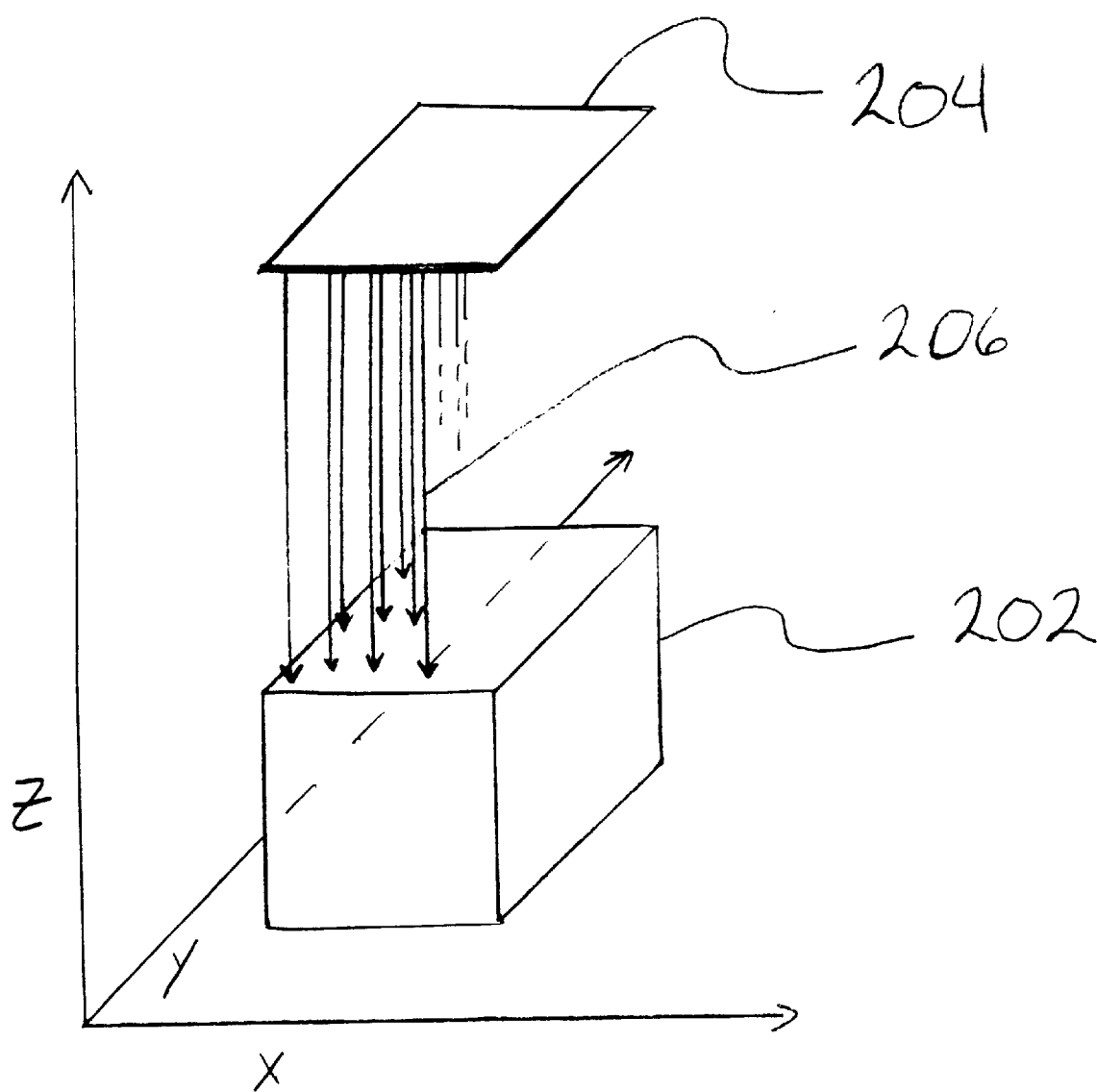
FIG. 2 is a conceptual image illustrating a method according to the present invention.

FIG. 2 illustrates a conceptual example of how the present invention operates. Data array 202 is comprised of angiographic data generated by a NMR system. In this example, data array 202 will be assumed to be a 5×5×5 matrix of data, although an actual 3D array of angiographic data would contain up to several million data points. Two dimensional image 204 represents a 2D image of 3D array 202. In FIG. 2, the 2D view is from the perspective of the z axis. However, the present invention can create a 2D image of the 3D array from any point of view. Extending from 2D image 204 are imaginary rays 206. From the point of view of 2D image 204, 3D array 202 appears as a 5×5 array of data, because, from 2D image 204's perspective, only the top face of 3D array 202 is visible. Due to this perspective, the size of 2D image 204 will also be 5×5. Since the size of 2D image 204 will be 5×5, twenty-five imaginary rays 206 are extended through data array 202 (one ray for each pixel in 2D image 204). Each of these rays will intersect five data points within data array 202.

If 2D image 204 was constructed using the MIP method, only one data point from the five data points intersected by each ray would be selected to control the display of a pixel in 2D image 204. However, according to the present invention, n data points are selected instead of a single data point. In this example, n can be 2–5. Once the n most intense data points lying along a given ray are determined, the points are summed together and this summation is used to control the intensity of a pixel in 2D image 204.

Selecting the n most intense data points along a given ray instead of the single most intense data point provides a number of advantages. First, if a given ray intersects two blood vessels existing at different levels within the 3D array, data points for each of the vessels can be taken into account, instead of simply selecting a single data point for one of the vessels, as is done in the MIP method. Selecting data points which represent two different vessels allows the 2D image to illustrate vessels existing at different depths within the patient, much like an x-ray angiography image. Also, by selecting n to be much less than the total number of data points intersected by a given ray, background tissue which is generally not of interest can be excluded from the 2D image.

As stated above, FIG. 2 is but a simple example of a 3D array of angiographic data and a corresponding 2D image. For actual arrays of 3D angiographic data and their corresponding 2D images, setting n equal to 10 has been found to provide high quality angiographic images. However, the optimal value for n can vary and depends upon a number of factors, such as the diameter of the target vessel and the area represented by a given data point. If the 3D array is to be viewed from a different perspective, the entire 3D array is rotated to the desired projection angle using some interpolation technique (e.g., bi-linear interpolation).

Figure 3:
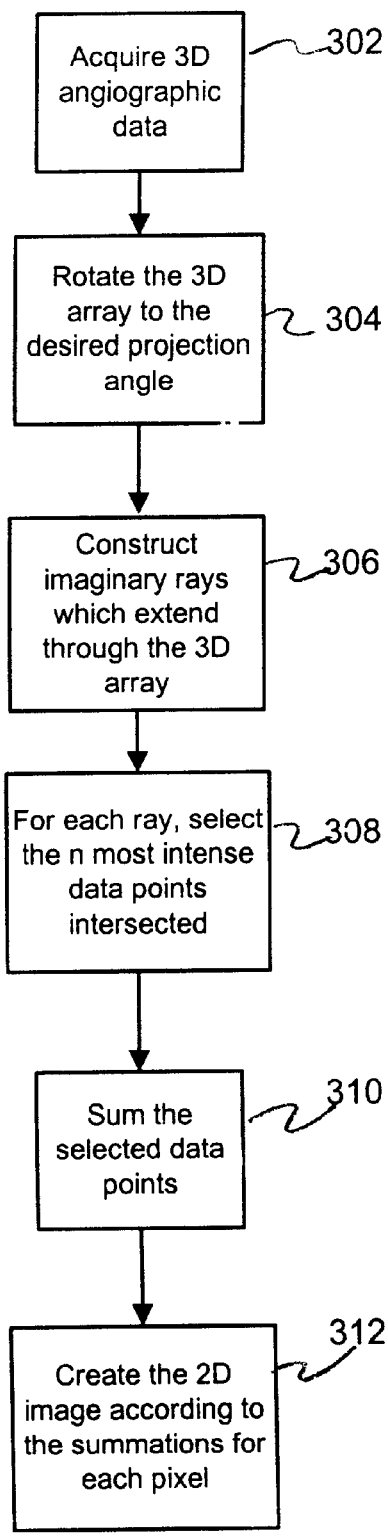
FIG. 3 is a flowchart showing a method according to the present invention.

FIG. 3 is a flowchart which illustrates the method according to the present invention. Initially, a 3D array of angiographic data is acquired (302). This is accomplished by utilizing a NMR system to gather the data from a patient, then transmitting the data to a suitable data processing system. As stated above, the prior art teaches many ways to accomplish this task. Next, the 3D array is rotated to the desired projection angle (304). After the 3D array is rotated, imaginary rays are extended through the 3D array for each pixel in the 2D image, according to the perspective from which the 2D image is being rendered (306). The rays are extended through the 3D array in such a way that each point within the array is intersected by a single ray. For each ray, the n most intense data points intersected by that ray are selected (308). Next, the data points selected by a given ray are summed together (310). This summation allows the data points at different depths within the 3D array to contribute to the final 2D image, unlike the MIP method, which simply selects a single data point along a given ray. Finally, the 2D image is created on a pixel by pixel basis with each pixel being displayed according to the sum of the n most data points intersected by the ray associated with that pixel (312). The 2D image can be displayed in shades of gray, or can be color-coded to indicated differences in the summations for each pixel.

Using the procedures discussed above, the present invention can also improve on the technique known as the Minimum Intensity Projection technique. The traditional version of this technique, as its name implies, is similar to the Maximum Intensity Projection technique, except instead of selecting the most intense data point along a ray, the least intense data point is selected. When this technique is applied to an appropriate set of MR data, images are formed with black blood vessels. The present invention improves on the traditional Minimum Intensity Projection technique by selecting n data points with intensities no greater than the other data points along a ray which has been projected through a 3D array of MR data, instead of the single least intense data point. Thus, the improved Minimum Intensity Projection technique is identical to the improved Maximum Intensity Projection technique, except it selects the n least intense data points instead of the n most intense data points.

The projection techniques presented above also find application with computer tomography (CT) angiography. Like MR angiography techniques, CT angiography acquires a series of slices through the volume of interest within the patient. The slices are then combined to form a 3D set of data. The projection techniques can then be applied to this data set in the same manner they are applied to MR data, i.e., by either summing the n most intense data points or the n least intense data points.

One variation of the projection methods discussed above takes the weighted sum of the n most intense data points. This variation has the effect of emphasizing the contributions of the most intense data points. For example, using this weighted sum method, if the three most intense data points were going to be used in determining the intensity of a given pixel, the most intense data point may be multiplied by 0.5, the second most intense point may be multiplied by 0.3, and the third most intense point may be multiplied by 0.2. After being multiplied by these weighting factors, the data points are summed together. The most effective weighting values will vary, depending on the data set being analyzed. This weighted sum technique can be used in analyzing the n least intense points as well.

Aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROMs or CD-ROM disks readable only by a computer I/O attachment); (b) information alterably stored on writable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed:

1. A method for constructing a two dimensional image from a three dimensional array of angiographic data, comprising:

a) obtaining the three dimensional array of angiographic data, wherein the array of angiographic data contains a plurality of data points;

b) constructing a plurality of rays through the array of angiographic data;

c) for each of the plurality of rays, selecting n data points intersected by the ray in the array of angiographic data, wherein n is greater than one, but less than the total number of data points intersected by the ray and the n data points selected for a given ray have intensities at least as great as the other data points intersected by the ray; and d) constructing the two dimensional image based upon a summation of the n data points selected for each of the plurality of rays.

2. The method as described in claim 1, wherein the two dimensional image contains a plurality of pixels, and each of the pixels is associated with one of the plurality of rays, and wherein the plurality of rays is equal to the plurality of pixels.

3. The method as described in claim 2, wherein a particular pixel associated with a particular ray is displayed according to the summation of the n data points intersected by the given ray.

4. The method as described in claim 1, further comprising rotating the three dimensional array of angiographic data to a desired projection angle.

5. The method as described in claim 1, further comprising associating a weighting factor with each of the n data points selected in the selecting step.

6. A computer for displaying a two dimensional angiographic image created from a three dimensional array of angiographic data, comprising:

a) a processing unit;

b) a display unit, connected to the processing unit; and c) a communication device, connected to the processing unit, for communicating with an NMR system, wherein the computer is operable to obtaining the three dimensional array of angiographic data, the computer being operable to display angiographic images;

wherein the processing unit:

i) receives an array of angiographic data containing a plurality of data points;

ii) constructs a plurality of rays through the array of angiographic data; and iii) for each of the plurality of rays, selects n data points intersected by the ray in the array of angiographic data, wherein n is greater than one, but less than the total number of data points intersected by the ray and the n data points selected for a given ray have intensities at least as great as the other data points intersected by the ray; and wherein the display unit constructs the two dimensional image based upon a summation of the n data points selected for each of the plurality of rays.

7. The computer as described in claim 6, wherein the two dimensional image contains a plurality of pixels, and each of the pixels is associated with one of the plurality of rays, and wherein the plurality of rays is equal to the plurality of pixels.

8. The computer as described in claim 7, wherein a particular pixel associated with a particular ray is displayed according to the summation, of the n data points intersected by the given ray.

9. The computer as described in claim 6, wherein the computer rotates the three dimensional array of angiographic data to a desired projection angle.

10. The computer as described in claim 6, wherein the computer associates a weighting factor with each of the n data points selected.

11. A method for constructing a two dimensional image from a three dimensional array of angiographic data, comprising:
   a) obtaining the three dimensional array of angiographic data, wherein the array of angiographic data contains a plurality of data points;
   b) constructing a plurality of rays through the array of angiographic data;
   c) for each of the plurality of rays, selecting n data points intersected by the ray in the array of angiographic data, wherein n is greater than one, but less than the total number of data points intersected by the ray and the n data points selected for a given ray have intensities no greater than the other data points intersected by the ray; and
   d) constructing the two dimensional image based upon a summation of the n data points selected for each of the plurality of rays.

12. The method as described in claim 11, wherein the two dimensional image contains a plurality of pixels, and each of the pixels is associated with one of the plurality of rays, and wherein the plurality of rays is equal to the plurality of pixels.

13. The method as described in claim 12, wherein a particular pixel associated with a particular ray is displayed according to the summation of the n data points intersected by the given ray.

14. The method as described in claim 11, further comprising rotating the three dimensional array of angiographic data to a desired projection angle.

15. The method as described in claim 11, further comprising associating a weighting factor with each of the n data points selected in the selecting step.

16. A computer for displaying a two dimensional angiographic image created from a three dimensional array of angiographic data, comprising:
   a) a processing unit;
   b) a display unit, connected to the processing unit; and
   c) a communication device, connected to the processing unit, for communicating with an NMR system, wherein the computer is operable to obtaining the three dimensional array of angiographic data, the computer being operable to display angiographic images;
   wherein the processing unit:
      i) receives an array of angiographic data containing a plurality of data points;
      ii) constructs a plurality of rays through the array of angiographic data; and
      iii) for each of the plurality of rays, selects n data points intersected by the ray in the array of angiographic data, wherein n is greater than one, but less than the total number of data points intersected by the ray and the n data points selected for a given ray have intensities no greater than the other data points intersected by the ray; and
   wherein the display unit constructs the two dimensional image based upon a summation of the n data points selected for each of the plurality of rays.

17. The computer as described in claim 16, wherein the two dimensional image contains a plurality of pixels, and each of the pixels is associated with one of the plurality of rays, and wherein the plurality of rays is equal to the plurality of pixels.

18. The computer as described in claim 17, wherein a particular pixel associated with a particular ray is displayed according to the summation of the n data points intersected by the given ray.

19. The computer as described in claim 16, wherein the computer rotates the three dimensional array of angiographic data to a desired projection angle.

20. The computer as described in claim 16, wherein the computer associates a weighting factor with each of the n data points selected.

* * * * *